US012608835B2

(12) United States Patent
Thiriet et al.

(10) Patent No.: US 12,608,835 B2
(45) Date of Patent: Apr. 21, 2026

(54) METHOD FOR DETERMINING VALLEY AREAS ACCESSIBLE BY AN AIRCRAFT

(71) Applicant: THALES, Courbevoie (FR)

(72) Inventors: Aurélien Thiriet, Merignac (FR); Lionel Gayraud, Palaiseau (FR)

(73) Assignee: THALES, Courbevoie (FR)

( * ) Notice: Subject to any disclaimer, the term of this patent is extended or adjusted under 35 U.S.C. 154(b) by 552 days.

(21) Appl. No.: 18/017,368

(22) PCT Filed: Jul. 16, 2021

(86) PCT No.: PCT/EP2021/069941
§ 371 (c)(1),
(2) Date: Jan. 20, 2023

(87) PCT Pub. No.: WO2022/017973
PCT Pub. Date: Jan. 27, 2022

(65) Prior Publication Data
US 2024/0013424 A1 Jan. 11, 2024

(30) Foreign Application Priority Data
Jul. 21, 2020 (FR) ...................................... 20 07650

(51) Int. Cl.
G06T 7/64 (2017.01)
G06T 3/40 (2024.01)
(Continued)

(52) U.S. Cl.
CPC .................. G06T 7/64 (2017.01); G06T 3/40 (2013.01); G06V 10/32 (2022.01); G06V 20/10 (2022.01);
(Continued)

(58) Field of Classification Search
CPC ............ G06V 20/10; G08G 5/21; G08G 5/55; G08G 5/74; G06T 2207/10032;
(Continued)

(56) References Cited

U.S. PATENT DOCUMENTS

| | | | | |
|---|---|---|---|---|
| 2012/0093434 A1* | 4/2012 | Banerjee | ................. | G06T 7/136 |
| | | | | 382/286 |
| 2016/0140851 A1* | 5/2016 | Levy | ........................ | G08G 5/34 |
| | | | | 701/410 |

(Continued)

FOREIGN PATENT DOCUMENTS

CN          108491962 A  *  9/2018  ............. G06Q 10/04

OTHER PUBLICATIONS

CN-108491962-A—English Translation (Year: 2018).*
(Continued)

*Primary Examiner* — Sumati Lefkowitz
*Assistant Examiner* — Aaron Joseph Sorrin
(74) *Attorney, Agent, or Firm* — NIXON & VANDERHYE

(57) ABSTRACT

Disclosed is a method for determining valley areas accessible by an aircraft, the method being implemented by an electronic device, the method including the following steps: obtaining an initial image of an environment including areas of valleys; processing the initial image so as to eliminate the imaged elements on the initial image, the dimension of the elements being less than a predetermined dimension, to obtain a first processed image; and determining the curvature of each imaged element in the first processed image, the valley areas accessible by the aircraft being the imaged elements, in the first processed image, the curvature of which is strictly less than zero.

21 Claims, 3 Drawing Sheets

(51) Int. Cl.

| | |
|---|---|
| *G06V 10/32* | (2022.01) |
| *G06V 20/10* | (2022.01) |
| *G08G 5/21* | (2025.01) |
| *G08G 5/55* | (2025.01) |
| *G08G 5/59* | (2025.01) |
| *G08G 5/74* | (2025.01) |

(52) U.S. Cl.
CPC ................. *G08G 5/21* (2025.01); *G08G 5/55* (2025.01); *G08G 5/59* (2025.01); *G08G 5/74* (2025.01); *G06T 2207/10032* (2013.01); *G06T 2207/20024* (2013.01); *G06T 2207/30181* (2013.01)

(58) Field of Classification Search
CPC .......... G06T 17/05; G06T 7/64; G01C 23/00; G01C 23/005; B64F 1/18; G05D 1/0676
See application file for complete search history.

(56) References Cited

U.S. PATENT DOCUMENTS

| | | | |
|---|---|---|---|
| 2017/0045894 A1* | 2/2017 | Canoy | G08G 5/55 |
| 2018/0218533 A1* | 8/2018 | Millin | G06T 17/05 |

OTHER PUBLICATIONS

International Search Report and Written Opinion of the ISA dated Nov. 2, 2021, for PCT/EP2021/066941, 10 pp.
French Search Report dated Mar. 25, 2021, for FR 2007650, 1 pg.
Robert Nagy, "Automatic detection of valley forms", Master Thesis, Department of Geosciences, University of Oslo, Nov. 9, 2015, 144 pp., at URL: https://www.duo.uio.no/bitstream/handle/10852/47643/Masters_pdf.pdf?sequence=1&isAllowed=y.
E. Theunissen et al., "Terrain Following and Terrain Avoidance with Synthetic Vision", Digital Avionics Systems Conference, 2005, The 24th Washington, DC, USA, Oct. 30-Nov. 3, 2005, vol. 1, Oct. 30, 2005, pp. 4.D.2-1, XP010868258, ISBN: 978-0-7803-9307-3.

* cited by examiner

METHOD FOR DETERMINING VALLEY AREAS ACCESSIBLE BY AN AIRCRAFT

CROSS-REFERENCE TO RELATED APPLICATIONS

This application is the U.S. national phase of International Application No. PCT/EP2021/069941 filed Jul. 16, 2021, which designated the U.S. and claims priority to FR2007650 filed Jul. 21, 2020, the entire contents of each of which are hereby incorporated by reference.

BACKGROUND OF THE INVENTION

Field of the Invention

The present invention relates to a method for determining valley areas accessible by an aircraft. The present invention further relates to the associated electronic device. The present invention further relates to an aircraft comprising such an electronic device.

Description of the Related Art

In the field of aeronautics, valleys are generally preferred by pilots in low altitude flight in order to benefit from the optical, magnetic and acoustic masking effects naturally brought by the terrain.

However, not all valleys are navigable which happens for two reasons. First, the flight dynamics aspects of a fixed-wing aircraft do not allow too strong radii of curvature to be used. Then, the pilots wish to be able to turn around in the valley without being forced to go up in altitude, thus potentially uncovering the presence thereof by leaving the natural masking, which excludes too narrow valleys.

Also, before entering a valley, the pilot has to make sure that the valley meets predefined operational features which would ensure the pilot's survival once having entered. It has to be possible e.g. to fly (in the dynamic sense of flight) within the valley and to turn around without being discovered. All such constraints can be satisfied by meeting a single "encompassing" constraint which is a sufficient width of the valley.

The pilot thus makes an estimation "by eye" from a navigation chart, external visual information, if appropriate, and his/her knowledge of the theater of operations.

However, such an estimation is not entirely reliable, and carries an increased risk of making a bad decision in flight. Indeed, according to the situation awareness model proposed by Endsley in 1988, good decision-making requires a good understanding of the situation and adequate management of the urgency of the decision. However, a good situation awareness is not enough for ensuring good decision-making. E.g., in 1995, Endsley identified that in 27% of aviation accidents, pilots had a good situation awareness, yet made a bad decision. The main reason for the above is very complex environments or cognitive resources limited by the decision time or the constraints of the situation (stress conditions).

In particular, decision-making with experienced operators is usually not a problem when the situation is known and well defined. However, when the situation is completely new and uncertain, decision making, even for experienced operators, is difficult. Moreover, when survival is at stake, instinct pushes the pilot to move away from the threat, sometimes adding new dangers along with a risk of reducing the chances of survival.

There is hence a need for a method for improving the determination of valley areas accessible by an aircraft.

SUMMARY OF THE INVENTION

To this end, the subject matter of the present description is a method for determining valley areas accessible by an aircraft, the method being implemented by an electronic device, the method comprising the following steps:
obtaining an initial image of an environment comprising areas of valleys,
processing the initial image so as to eliminate the imaged elements on the initial image, the dimension of said elements being less than a predetermined dimension, to obtain a first processed image, and
determining the curvature of each imaged element in the first processed image, the valley areas accessible by the aircraft being the imaged elements, in the first processed image, the curvature of which is strictly less than zero.

According to other advantageous aspects of the invention, the method comprises one or a plurality of the following features, taken individually or according to all technically possible combinations:
the method comprises the determination of a flight path for the aircraft, depending on the determined accessible valley areas;
the method comprises a step of processing the first processed image so as to assign a zero value to the elements imaged on the first processed image the curvature of which is positive, so as to obtain a second processed image;
the method comprises a step of processing the second processed image so as to obtain a final image, the step of processing the second processed image comprising:
the normalization of the histogram of the second processed image, and/or
the increase of the contrast of the second processed image by a predetermined value, where appropriate after normalizing the histogram, and/or
the increase of the resolution of the second processed image, where appropriate after normalizing the histogram and increasing the contrast, so that the resolution of the final image is equal to the resolution of the initial image;
the method comprises a step of displaying the final image on a display, the display being advantageously installed in an aircraft and the final image being preferentially displayed according to the position of the aircraft determined in real time;
the method further includes:
a step of defining a cost criterion aimed at favoring the valley areas according to the final image, and
a step of determining flight paths for the aircraft meeting the defined cost criterion;
the initial image processing step comprises:
reducing the resolution of the initial image so as to remove the imaged elements on the initial image, the dimension of which is less than the predetermined dimension, and
applying a Gaussian blur filter to the resulting reduced resolution image so as to obtain the first processed image;
during the acquisition step, the initial image of the environment is obtained by means of measurements made by a sensor, such as a camera or a satellite.

The present description further relates to an electronic device configured for implementing a determination method such as described hereinabove.

The present description further relates to an aircraft comprising an electronic device such as described above.

The present description also relates to a computer program product comprising a readable storage medium, on which a computer program is stored comprising program instructions, the computer program being loadable on a data processing unit and implementing and suitable for leading to the implementation of a determination method such as described hereinabove when the computer program is implemented on the data processing unit.

The present description further relates to a readable information medium on which a computer program product is stored such as described hereinabove.

BRIEF DESCRIPTION OF THE DRAWINGS

Other features and advantages of the invention will appear upon reading the following description which follows embodiments of the invention, given only as a limiting example, and making reference to the following drawings.

DESCRIPTION OF THE PREFERRED EMBODIMENTS

Figure 1:
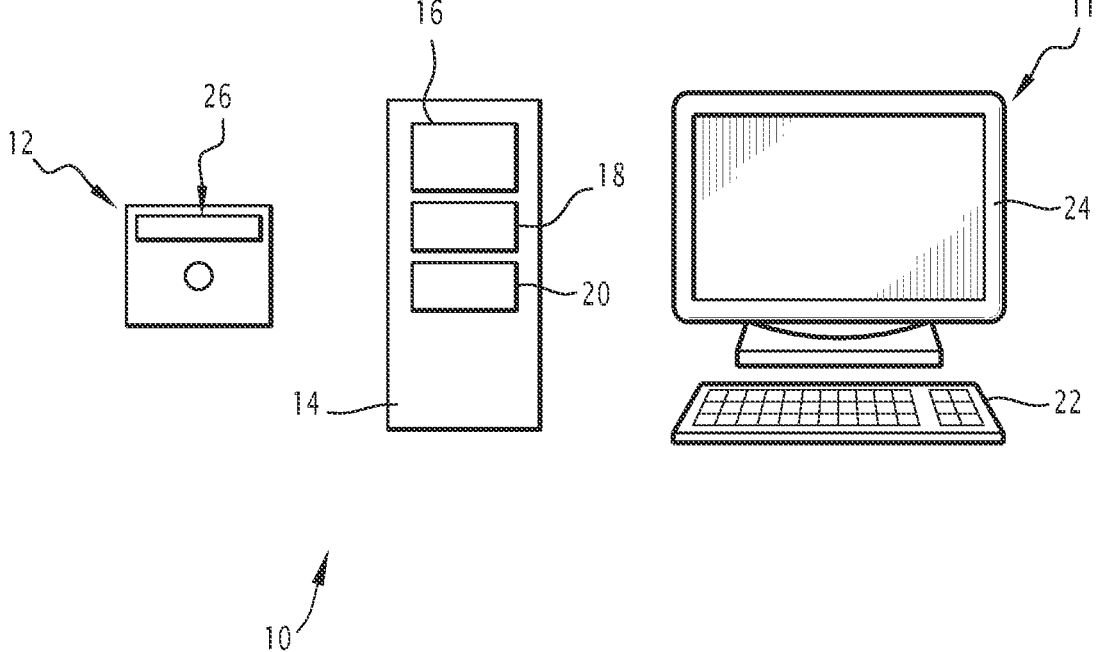
FIG. 1 is a schematic representation of an example of electronic device.

FIG. 1 shows an example of an electronic device 10 configured for determining valley areas accessible by an aircraft.

Valley areas are areas of an environment which are intended to be overflown by the aircraft. A valley area is defined as a geographical depression generally with an elongated shaped and shaped in a relief (e.g. by a stream or a glacier). In other words, a valley is a hollow in a terrain.

A valley area is considered accessible by an aircraft when the width of the valley or valleys which form the area is greater than or equal to a predefined width. The valley thus meets predefined operational features e.g., according to which it is possible to have good flight dynamics (limited radii of curvature) and to turn around in the valley without being discovered.

In the example illustrated in FIG. 1, the electronic device 10 comprises a calculator 11 and a computer program product 12.

The calculator 11 is preferentially a computer.

More generally, the calculator 11 is an electronic calculator suitable for manipulating and/or transforming data represented as electronic or physical quantities in registers of the calculator 11 and/or memories into other similar data corresponding to physical data in memories, registers or other types of display, transmission or storage.

The calculator 11 interacts with the computer program product 12.

As shown in FIG. 1, the calculator 11 includes a processor 14 comprising a data processing unit 16, memories 18 and a data medium drive 20. In the example illustrated in FIG. 1, the calculator 11 comprises a human-machine interface 22, such as a keyboard, and a display 24.

The computer program product 12 includes a storage medium 26.

The storage medium 26 is a medium readable by the calculator 11, usually by the data processing unit of the computer 16. The readable storage medium 26 is a medium suitable for storing electronic instructions and apt to be coupled to a bus of a computer system.

As an example, the storage medium 26 is a USB key, a diskette or a floppy disk, an optical disk, a CD-ROM, a magneto-optical disk, a ROM, a RAM, an EPROM, an EEPROM, a magnetic card or an optical card.

The computer program 12 containing program instructions is stored on the storage medium 26.

The computer program 12 can be loaded into the data processing unit 16 and is suitable for leading to the implementation of a method for determining valley areas when the computer program 12 is implemented on the processing unit 16 of the calculator 11.

In another embodiment (not shown), the calculator 11 is produced in the form of one or a plurality of programmable logic components, such as an FPGA (Field Programmable Gate Array), or further in the form of one or a plurality of dedicated integrated circuits, such as ASIC (Application Specific Integrated Circuit). In such case, the calculator 11 is configured for implementing a determination method as will be described hereinafter in the description.

The electronic device 10 is e.g. fully integrated in an aircraft.

In a variant, the electronic device 10 is e.g. installed partly in a ground unit and partly in an aircraft. In such case, the electronic device 10 comprises e.g. a first calculator 11 on the ground and a second calculator 11 integrated into the aircraft 14.

Figure 2:
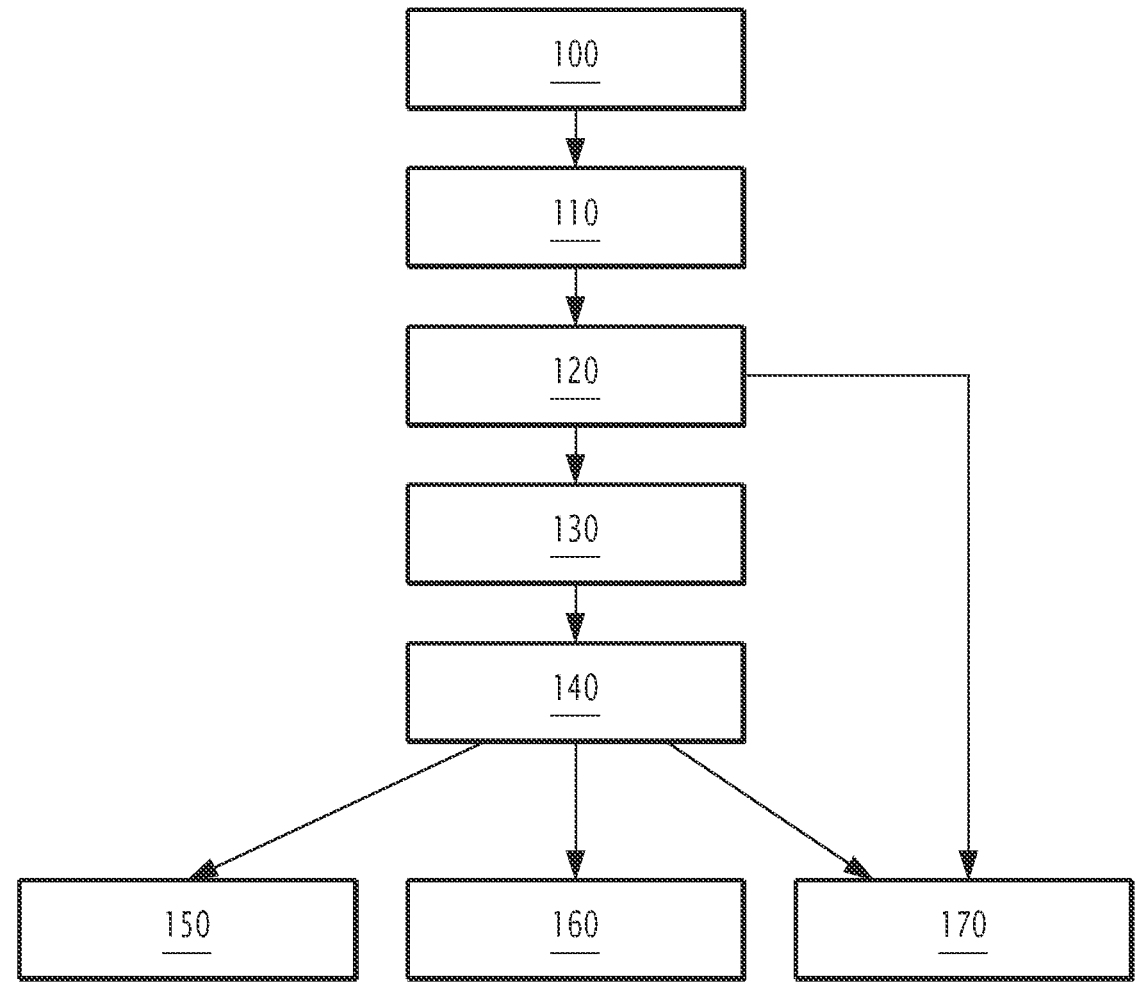
FIG. 2, an organization chart of an example of implementation of a method for determining valley areas, and FIG. 3, a schematic representation of a terrain elevation for a central point and the eight neighbors around the central point.

The operation of the electronic device 10 will now be described with reference to FIG. 2 which schematically illustrates an example of the implementation of a method for determining valley areas accessible by an aircraft and to FIG. 3 which illustrates in more detail an example of a step of said method.

The determination method is e.g. suitable for being implemented during a phase of preparation of the flight of the aircraft 14 so as to define upstream paths for the aircraft, favoring the valley areas.

In a variant or in addition, the determination method is suitable for being implemented during the flight of the aircraft 14. The above allows e.g. the pilot to favor the valley areas if the pilot wishes or needs to modify the flight path thereof.

The different steps of the determination method are implemented by the electronic device 10, in particular by the calculator 11, i.e. are implemented by computer.

The determination method comprises a step 100 of obtaining an initial image $IM_I$ of an environment comprising valley areas.

The initial image $IM_I$ is e.g. a digital terrain image, i.e. a digital representation of the altitudes of a terrain (either real or fictitious). The initial image $IM_I$ was e.g. obtained by means of measurements made by one or a plurality of sensors. The initial image $IM_I$ e.g. was acquired by one or a plurality of sensors during the flight of an aircraft carrying said sensor(s). The or at least one sensor is e.g. a stereoscopic camera or a lidar. In a variant, the initial image $IM_I$ was acquired by a satellite system.

The determination method comprises a step 110 of processing the initial image IM 1 so as to remove the elements imaged on the initial image $IM_I$ the dimension of which is less than a predetermined dimension, so as to obtain a first processed image $IM1_T$. The predetermined dimension was chosen so as to remove valleys (too narrow) with a width less than the minimum width of the valleys sought, i.e. valleys considered accessible by the aircraft. The predetermined dimension has been chosen e.g. so as to remove valleys with a width of less than 3000 meters.

The processing step 110 comprises in particular the reduction of the resolution of the initial image $IM_I$ so as to remove the elements imaged on the initial image $IM_I$ the dimension of which is smaller than a predetermined dimension.

To this end, the sampling frequency is chosen according to the predetermined dimension. The above means applying the reciprocal of Shannon's theorem, according to which "sampling an image with regularly spaced samples can describe a signal provided that the signal contains no frequency greater than half the sampling frequency, called the Nyquist frequency".

At the end of such reduction, the details of the digital terrain model smaller than the predetermined dimension are removed, and consequently the valleys of a size smaller than such dimension.

Advantageously, the processing step 110 also comprises the application of a Gaussian blur filter to the image of reduced resolution obtained so as to obtain the first processed image $IM1_T$.

The Gaussian Blur Filter is a digital filter which blurs a digital image by attenuating sudden changes in intensity by calculating the weighted average of the values of the neighborhood of each pixel. The pixels of the neighborhood which are close to the central pixel have a greater weight (more influence) than the pixels which are farther away. The weights to be applied are calculated as follows: Gaussian kernel coefficients $a_{i,j}=\exp(-(I^2+j^2)/2\sigma^2)$ where i is the distance to the origin along the horizontal axis, j is the distance to the origin along the vertical axis, and a is the standard deviation of the Gaussian distribution.

By applying such a Gaussian blur filter, the "staircase effects" linked to the resolution reduction are reduced on the first processed image $IM1_T$.

The determination method comprises a step 120 of determining the curvature of each imaged element on the first processed image $IM1_T$. The valley areas accessible by the aircraft are the elements imaged on the first processed image $IM1_T$ the curvature of which is strictly less than zero (negative).

The curvature determination step (120) is based e.g. on the article by Zevenbergen, L. W., Thorne, C. R., 1987, Entitled "Quantitative analysis of land surface topography", published in Earth surface processes and landforms, volume 12, pages 47 to 56.

In particular, according to said article, the curvature of the plane at any point of the terrain, called the central point, is obtained via a polynomial identification based on the central point and the eight closest surrounding neighbors thereof within a Cartesian grid.

Figure 3:
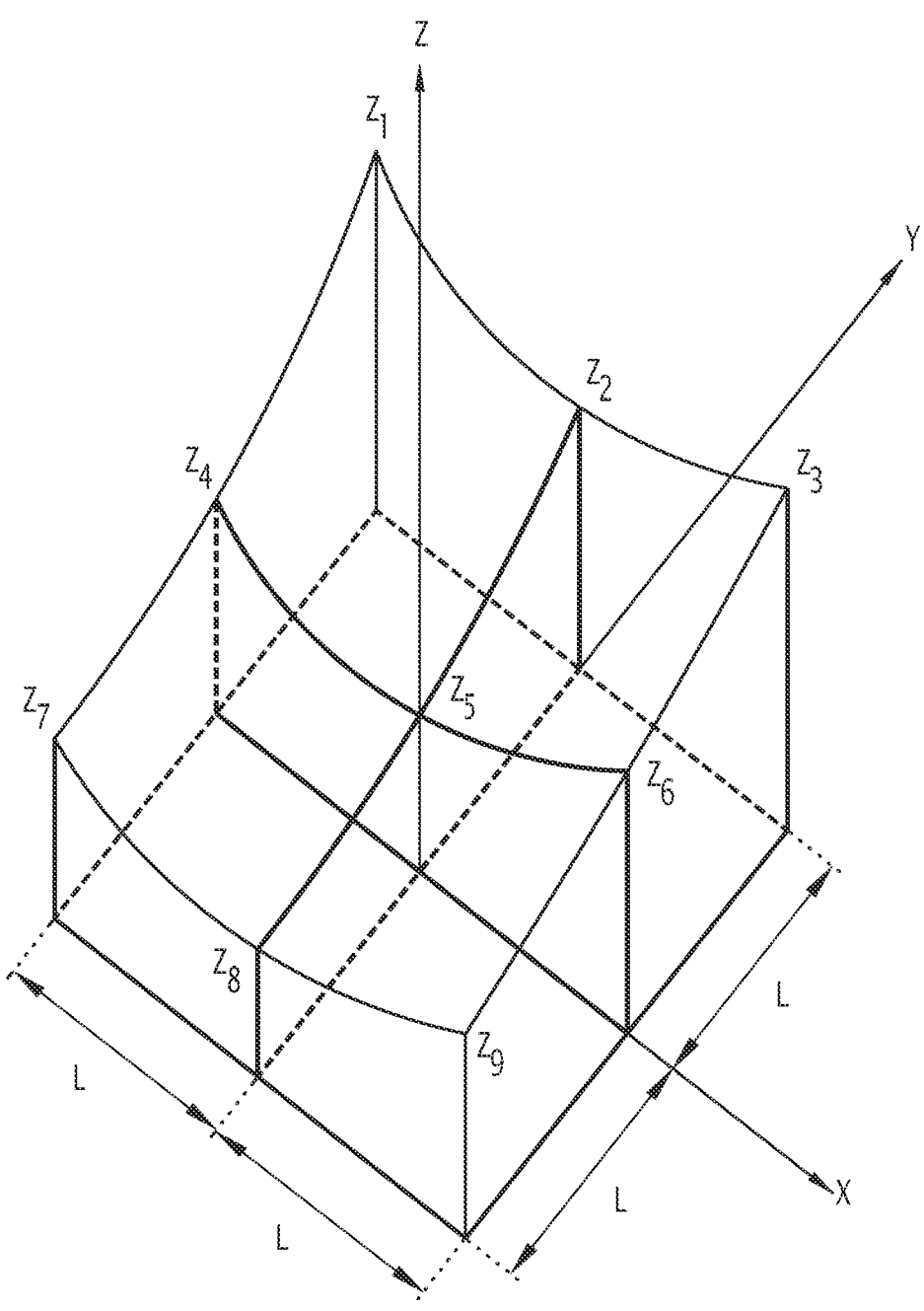

More precisely, with reference to FIG. 3, the elevation of the terrain at each of the nine points considered is noted $Z_1$ to $Z_9$ (point 5 being the central point, points 1 to 4 and 6 to 9 the neighboring points).

Ten coefficients (denoted by A, B, C, D, E, F, G, H, I, J) are obtained by identification with a Lagrange polynomial $Z(x,y)=Ax^2y^2+Bx^2y+Cxy^2+Dx^2+Ey^2+Fxy,+Gx+Hy+I$, assumed to approximate the height of the terrain in any point (x,y) situated in the zone of the plan delimited by the eight neighbors.

The curvature of the terrain is then obtained by deriving in the vicinity of the central point: $Curvature \equiv \partial^2 Z/\partial^2 S = 2(D\cos^2\varphi + E\sin^2\varphi + F\cos\varphi \sin\varphi)$ where $\varphi$ is an azimuthal direction.

In order to define a quantity characterizing the central point (and hence not dependent on the azimuthal direction $\varphi$), a quantity is defined combining the curvature in two complementary directions: the direction of greatest slope $\theta = \arctan(-H/-G)$ and the complement thereof $$\phi \equiv \theta + \frac{\pi}{2}.$$

The characteristic quantity thus obtained is called the "terrain curvature" and is equal to 2(D+E).

The determination method comprises a step 130 of processing the first processed image $IM1_T$ so as to assign a zero value to the elements imaged on the first processed image $IM1_T$ the curvature of which is positive, so as to obtain a second processed image $IM2_T$. The above means keeping only the "hollows" on the second processed image $IM2_T$, such hollows being the valley areas accessible by the aircraft.

Advantageously, the method comprises a step 140 of processing the second processed image $IM2_T$ so as to obtain a final image $IM_F$. The processing step of the second processed image $IM2_T$ comprises e.g.:

The normalization (between 0 and 1) of the histogram of the second processed image $IM2_T$, and/or the increase of the contrast of the second processed image $IM2_T$ by a predetermined value (e.g. to the power 100), where appropriate after normalizing the histogram, and/or the increase of the resolution of the second processed image $IM2_T$, where appropriate after normalizing the histogram and increasing the contrast, so that the resolution of the final image $IM_F$ is equal to the resolution of the initial image $IM_I$.

The normalization and the increase of contrast make it possible to obtain a final image $IM_F$ in which the determined valley areas are highlighted on the final image $IM_F$ with a range of values corresponding to the sensitivity of the human eye. The above two actions also allow images usable by a neural network to be obtained.

Increasing the resolution makes it possible to obtain a final image $IM_F$ of the same dimension as the initial image $IM_I$, which makes it easier to use the final image $IM_F$ e.g. by comparing same with the initial image $IM_I$.

Optionally, the method comprises a step 150 of displaying the final image $IM_F$ on a display, such as the display 24 of the calculator 11.

In one example, the final image $IM_F$ is e.g. superimposed on the initial image $IM_I$.

Advantageously, when the display 24 is installed in an aircraft and the aircraft is in flight, the final image $IM_F$ is preferentially displayed according to the position of the aircraft, determined in real time. In this way it is possible to display the most relevant determined accessible valley areas according to the position of the aircraft.

Optionally, the method comprises a step 160 of using the final image $IM_F$ as a cost map in a tool for determining the flight path for the aircraft (e.g. using an Eikonal type solver).

The use step 160 comprises e.g. the definition of a cost criterion aimed at favoring the valley areas depending on the final image $IM_F$, and the determination of flight paths for the aircraft satisfying the defined cost criterion.

More generally, a person skilled in the art will understand that the final image $IM_F$ obtained is suitable for being supplied as input to any system using the data from said image such [as] an image, particularly in the field of artificial intelligence, as input to a convolutional neural network for image analysis.

Advantageously, the determination method comprises a step 170 of determining a flight path for the aircraft depending on the determined accessible valley areas. The determination step 170 is e.g. implemented just after the processing step 140, or just after the determination step 120. To facilitate decision making, the modification step 170 is advantageously performed following the display step 150.

When the aircraft overflies said environment, the determination step 170 advantageously comprises modifying the path of the aircraft according to the determined accessible valley areas. The path is thereby modified by favoring the valleys which have been determined to be accessible by the aircraft.

Thereby, the present method assists pilots in the decision-making thereof on the navigations thereof by determining the valley areas accessible by the aircraft. In particular, the present method provides the pilot with a better situation awareness.

The present method can be used in particular for identifying compatible valleys from a digital terrain model and for superimposing e.g. the result obtained on a digital map in order to visually highlight good valleys. Advantageously, the result obtained can be mathematically used as a cost map or partial cost map to be aggregated, seen from an Eikonal solver, in order to encourage the solver to find a path from a point A to a point B passing through the valleys identified by the method.

Thereby, the present method makes it possible to improve the determination of valley areas accessible by an aircraft, and thus to improve the decision-making of a pilot faced with unexpected situations.

A person skilled in the art would understand that the embodiments described hereinabove are likely to be combined with one another when such a combination is compatible and that the applications described are given as examples.

The invention claimed is:

1. A method for determining valley areas accessible by an aircraft, the method being implemented by an electronic device, the method comprising:
   a. obtaining an initial image of an environment comprising valley areas,
   b. processing of the initial image so as to eliminate imaged elements on the initial image, dimensions of which are smaller than a predetermined dimension, to obtain a first processed image, said processing comprising:
   i. reducing resolution of the initial image so as to remove those imaged elements on the initial image whose dimension is less than the predetermined dimension, and
   ii. applying a Gaussian blur filter to the resulting reduced resolution image so as to obtain the first processed image, and
   c. determining a curvature of remaining imaged elements in the first processed image, the valley areas accessible by the aircraft being the remaining imaged elements, in the first processed image, the curvatures of which are strictly less than zero.

2. The method of claim 1, wherein the method comprises determining a flight path for the aircraft, depending on the determined accessible valley areas.

3. The method according to claim 2, wherein the method comprises a step of processing the first processed image so as to assign a zero value to the imaged elements on the first processed image the curvature of which is positive, so as to obtain a second processed image.

4. The method according to claim 2, wherein the step of processing the initial image comprises:
   a. reducing the resolution of the initial image so as to remove the imaged elements on the initial image the dimension of which is less than the predetermined dimension, and
   b. applying a Gaussian blur filter to the resulting reduced resolution image so as to obtain the first processed image.

5. The method according to claim 1, wherein the method comprises a step of processing the first processed image so as to assign a zero value to the remaining imaged elements on the first processed image the curvature of which is positive, so as to obtain a second processed image.

6. The method according to claim 5, wherein the method comprises a step of processing the second processed image so as to obtain a final image, the step of processing the second processed image comprising
   the normalization of a histogram of the second processed image.

7. The method according to claim 6, wherein the method comprises a step of displaying the final image on a display.

8. The method according to claim 7, wherein the method further comprises:
   a. a step of defining a cost criterion aimed at favoring the valley areas according to the final image, and
   b. a step of determining flight paths for the aircraft meeting the defined cost.

9. The method according to claim 7, wherein the step of processing the initial image comprises:
   a. reducing the resolution of the initial image so as to remove the imaged elements on the initial image the dimension of which is less than the predetermined dimension, and
   b. applying a Gaussian blur filter to the resulting reduced resolution image so as to obtain the first processed image.

10. The method according to claim 6, wherein the method further comprises:
   a. a step of defining a cost criterion aimed at favoring the valley areas according to the final image, the cost criterion being a threshold, and
   b. a step of determining flight paths for the aircraft meeting the defined cost criterion.

11. The method according to claim 10, wherein the step of processing the initial image comprises:
   a. reducing the resolution of the initial image so as to remove the imaged elements on the initial image the dimension of which is less than the predetermined dimension, and
   b. applying a Gaussian blur filter to the resulting reduced resolution image so as to obtain the first processed image.

12. The method of claim 6, wherein a display is installed in an aircraft.

13. The method of claim 12, wherein the final image is displayed according to the position of the aircraft, determined in real time.

14. The method according to claim 6, wherein the step of processing the initial image comprises:

a. reducing the resolution of the initial image so as to remove the imaged elements on the initial image the dimension of which is less than the predetermined dimension, and b. applying a Gaussian blur filter to the resulting reduced resolution image so as to obtain the first processed image.

15. The method according to claim 5, wherein the step of processing the initial image comprises:

a. reducing the resolution of the initial image so as to remove the imaged elements on the initial image the dimension of which is less than the predetermined dimension, and b. applying a Gaussian blur filter to the resulting reduced resolution image so as to obtain the first processed image.

16. The method according to claim 5, further comprising processing the second processed image so as to obtain a final image, the processing of the second processed image comprising increasing a contrast of the second processed image by a predetermined value, optionally after normalizing the histogram.

17. The method according to claim 5, further comprising processing the second processed image so as to obtain a final image, the processing of the second processed image comprising increasing a resolution of the second processed image, optionally after normalizing the histogram and increasing contrast, so that a resolution of the final image is equal to a resolution of the initial image.

18. The method according to claim 1, wherein in the obtaining step, the initial image of the environment is obtained by means of measurements made by a sensor.

19. The method of claim 18, wherein the sensor is a camera or a satellite.

20. An electronic device for determining valley areas accessible by an aircraft, the electronic device being configured to:

a. obtain an initial image of an environment comprising valley areas, b. process the initial image so as to eliminate imaged elements on the initial image, dimensions of which are smaller than a predetermined dimension, to obtain a first processed image, the processing comprising:

i. reduction of the resolution of the initial image so as to remove the imaged elements on the initial image the dimension of which is less than the predetermined dimension, and ii. application of a Gaussian blur filter to the resulting reduced resolution image so as to obtain the first processed image, and c. determine a curvature of remaining imaged elements in the first processed image, the valley areas accessible by the aircraft being the remaining imaged elements, in the first processed image, the curvatures of which are strictly less than zero.

21. An aircraft comprising the electronic device according to claim 20.

\* \* \* \* \*